United States Patent
Wu

(10) Patent No.: US 7,126,769 B1
(45) Date of Patent: Oct. 24, 2006

(54) THIN MAGNIFIER STRUCTURE WITH MAGNETIC PROTECTIVE JACKET

(76) Inventor: Michael Wu, 1F, No.16, Yu-Jen Rd., Pei-Tou Dist., Taipei (TW)

( * ) Notice: Subject to any disclaimer, the term of this patent is extended or adjusted under 35 U.S.C. 154(b) by 0 days.

(21) Appl. No.: 11/106,589

(22) Filed: Apr. 15, 2005

(51) Int. Cl.
*G02B 7/02* (2006.01)

(52) U.S. Cl. ............... 359/817; 359/742; 359/802; 359/803; 359/808; 359/811

(58) Field of Classification Search ............ 359/742, 359/802, 803, 808, 811, 817
See application file for complete search history.

(56) References Cited

U.S. PATENT DOCUMENTS 5,986,823 A * 11/1999 Yang, Jr. ............... 359/742
6,764,192 B1 * 7/2004 McChesney ............ 362/98

* cited by examiner

*Primary Examiner*—Hung Xuan Dang
*Assistant Examiner*—Joseph Martinez
(74) *Attorney, Agent, or Firm*—Troxell Law Office, PLLC

(57) ABSTRACT

A thin magnifier structure with magnetic protective jacket, including a transparent magnifying member, a magnetic jacket and a pivot member. The transparent magnifying member integrally has a magnifier and is movably clipped and hidden in the magnetic jacket. The transparent magnifying member and the magnetic jacket are pivotally connected with each other via the pivot member, whereby the transparent magnifying member can be pivoted about the pivot member out of or into the magnetic jacket. When not used, the transparent magnifying member is clipped and hidden in the magnetic jacket, whereby the magnifier is protected from being scraped by any alien article. In use, the transparent magnifying member is pivoted about the pivot member out of the magnetic jacket. At this time, a user can hold the magnetic jacket with a hand to see an object through the magnifier without contaminating the magnifier. The thin magnifier structure is also usable as a bookmark.

4 Claims, 5 Drawing Sheets

THIN MAGNIFIER STRUCTURE WITH MAGNETIC PROTECTIVE JACKET

BACKGROUND OF THE INVENTION

The present invention is related to a thin magnifier structure with magnetic protective jacket, including a transparent magnifying member and a magnetic jacket. When not used, the transparent magnifying member is clipped and hidden in the magnetic jacket, whereby the magnifier is protected from being scraped by any alien article. In use, the transparent magnifying member is pivoted out of the magnetic jacket and a user can hold the magnetic jacket without contaminating the magnifier. The thin magnifier structure is also usable as a bookmark.

A conventional bookmark is a thin sheet made of paper material or plastic material to be inserted between two pages of a book. Such bookmark is thin and light. When sandwiched between the pages of the book, the thickness of the book will not be apparently increased. Moreover, the book with the bookmark can be easily carried.

However, in the case that the thin paper-made or plastic-made bookmark is folded or torn, the appearance of the bookmark will be ruined and the bookmark may be damaged. In addition, the bookmark is simply sandwiched between the pages without any other fixing measure. Therefore, when turning the pages of the book, the bookmark tends to drop out or even be missed.

Taiwanese Patent Application No. 87216071, entitled "magnifier magnetic bookmark" discloses a bookmark with magnifier function. The bookmark includes a transparent magnifying member, a magnetic rubber board and a rivet member. The magnifying member has a through hole and the magnetic rubber board is also formed with a through hole. The magnifying member overlaps the magnetic rubber board with the through holes aligned with each other. The rivet member is passed through the through holes to integrally rivet the magnifying member and the magnetic rubber board with each other so as to form a magnetic bookmark with magnifier function. The magnetic rubber board can attract and attach to an iron-made object. The magnifying member and the magnetic rubber board define therebetween a clipping gap for clipping a memo. Such bookmark also serves as a magnifier.

However, the above bookmark has some shortcomings as follows:

1. The transparent magnifying member is overlaid on the magnetic rubber board. Therefore, only one face of the transparent magnifying member is protected by the magnetic rubber board, while the other face of the transparent magnifying member is exposed to outer side. The exposed face of the transparent magnifying member tends to be scraped or contaminated by an alien article. Therefore, the function of the transparent magnifying member will be affected to shorten the using life of the bookmark.
2. The transparent magnifying member is riveted with the magnetic rubber board to define a clipping gap for clipping papers or memos as a bookmark. However, when turning the pages of a book, the bookmark still tends to drop out of the book.
3. The transparent magnifying member is pivotally riveted with the magnetic rubber board. After a period of rotating the transparent magnifying member and clipping papers, the rivet member tends to loosen. At this time, the transparent magnifying member can hardly truly overlap the magnetic rubber board. As a result, the transparent magnifying member is easy to be pressed and folded. In addition, the bookmark will be unable to firmly clip the papers.

SUMMARY OF THE INVENTION

It is therefore a primary object of the present invention to provide a thin magnifier structure with magnetic protective jacket. The thin magnifier structure includes a transparent magnifying member, a magnetic jacket and a pivot member for pivotally connecting the transparent magnifying member with the magnetic jacket. The transparent magnifying member integrally has a magnifier. The magnetic jacket has two magnetic vanes which can be folded to attract each other or unfolded from each other. The transparent magnifying member is movably clipped and hidden in the magnetic jacket. When not used, the transparent magnifying member is firmly clipped and hidden between the magnetic vanes of the magnetic jacket, whereby the magnifier is protected from being scraped by any alien article. In use, the transparent magnifying member is pivoted about the pivot member out of the magnetic jacket. At this time, a user can hold the magnetic jacket with a hand without contaminating the magnifier. The thin magnifier structure is also usable as a bookmark.

The present invention can be best understood through the following description and accompanying drawings wherein:

DETAILED DESCRIPTION OF THE PREFERRED EMBODIMENTS

Figure 1:
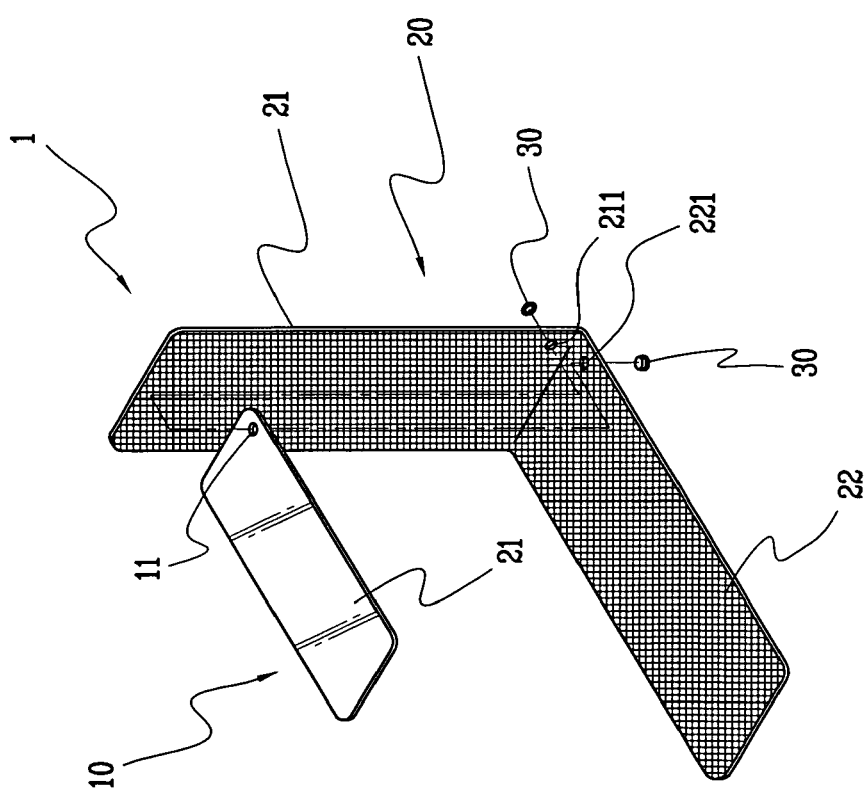
FIG. 1 is a perspective exploded view of the present invention.
Figure 2:
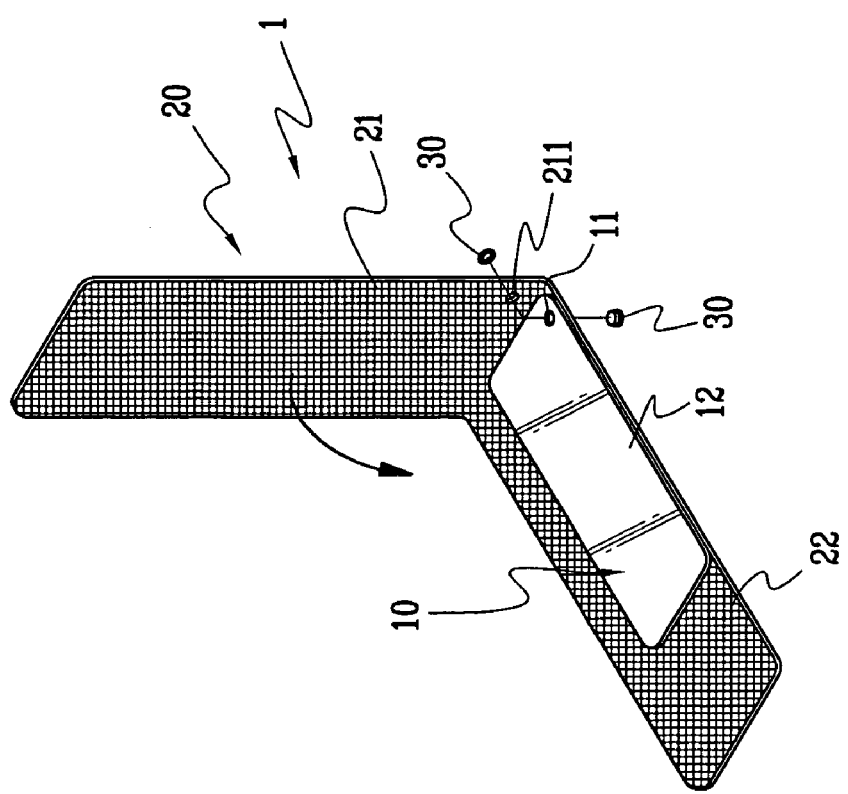
FIG. 2 is a perspective partially assembled view of the present invention.

Please refer to FIGS. 1 and 2. The thin magnifier structure 1 with magnetic protective jacket of the present invention includes a transparent magnifying member 10, a magnetic jacket 20 and a pivot member 30. The transparent magnifying member 10 has a magnifier 12 formed with a through hole 11. The magnetic jacket 20 has two vanes 21, 22 which can attract each other to clip the transparent magnifying member 10. At least one of the vanes 21, 22 is formed with a through hole 211, 221 corresponding to the through hole 11 of the transparent magnifying member 10. The transparent magnifying member 10 can be sandwiched between the two vanes 21, 22 and clipped by the vanes 21, 22. Accordingly, the transparent magnifying member 10 is hidden in the magnetic jacket 20. The pivot member 30 is fitted through the through hole 11 of the transparent magnifying member 10 and the through holes 211, 221 of the magnetic jacket 20 to pivotally connect the transparent magnifying member 10 with the magnetic jacket 20.

Figure 3:
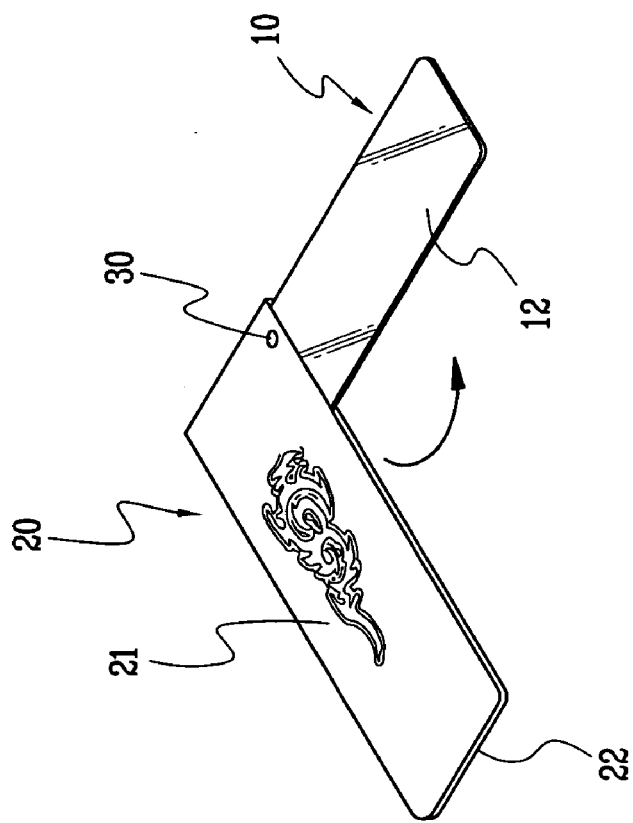
FIG. 3 is a perspective assembled view of the present invention.
Figure 4:
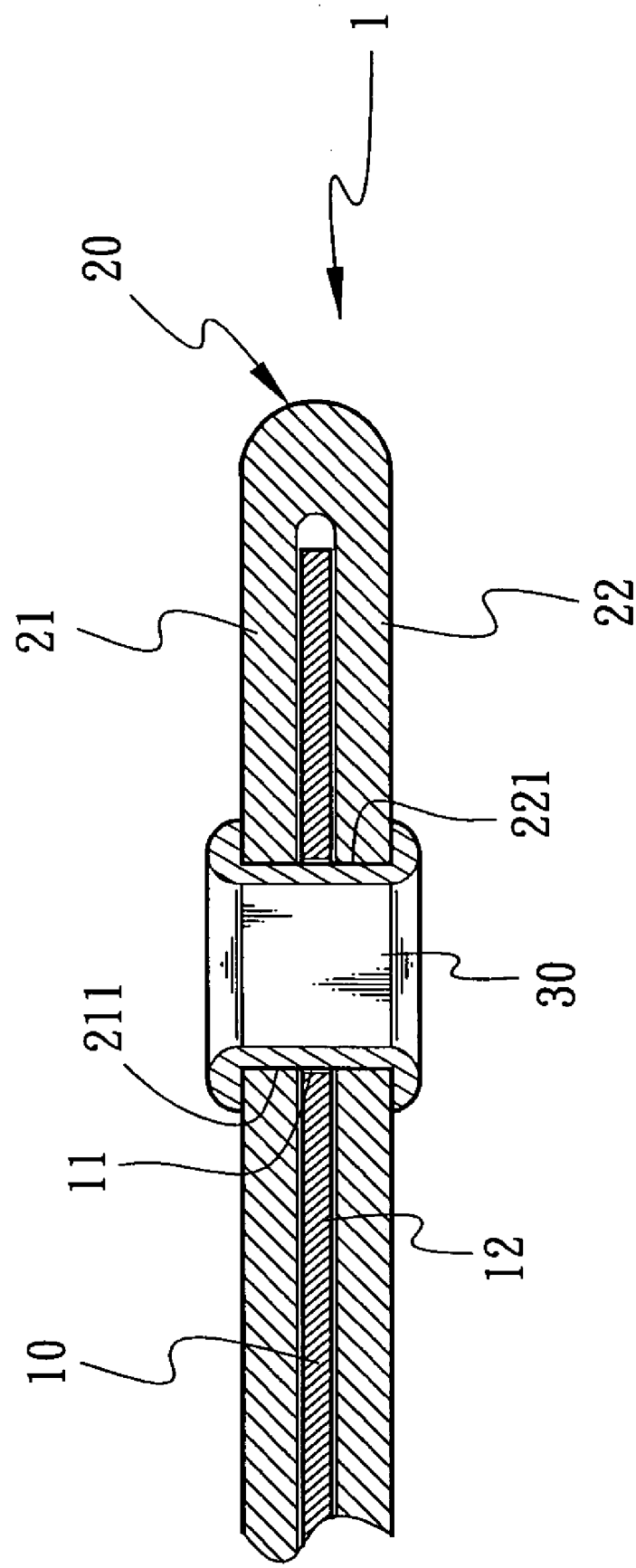
FIG. 4 is a sectional view of the pivoted section of the present invention.
Figure 5:
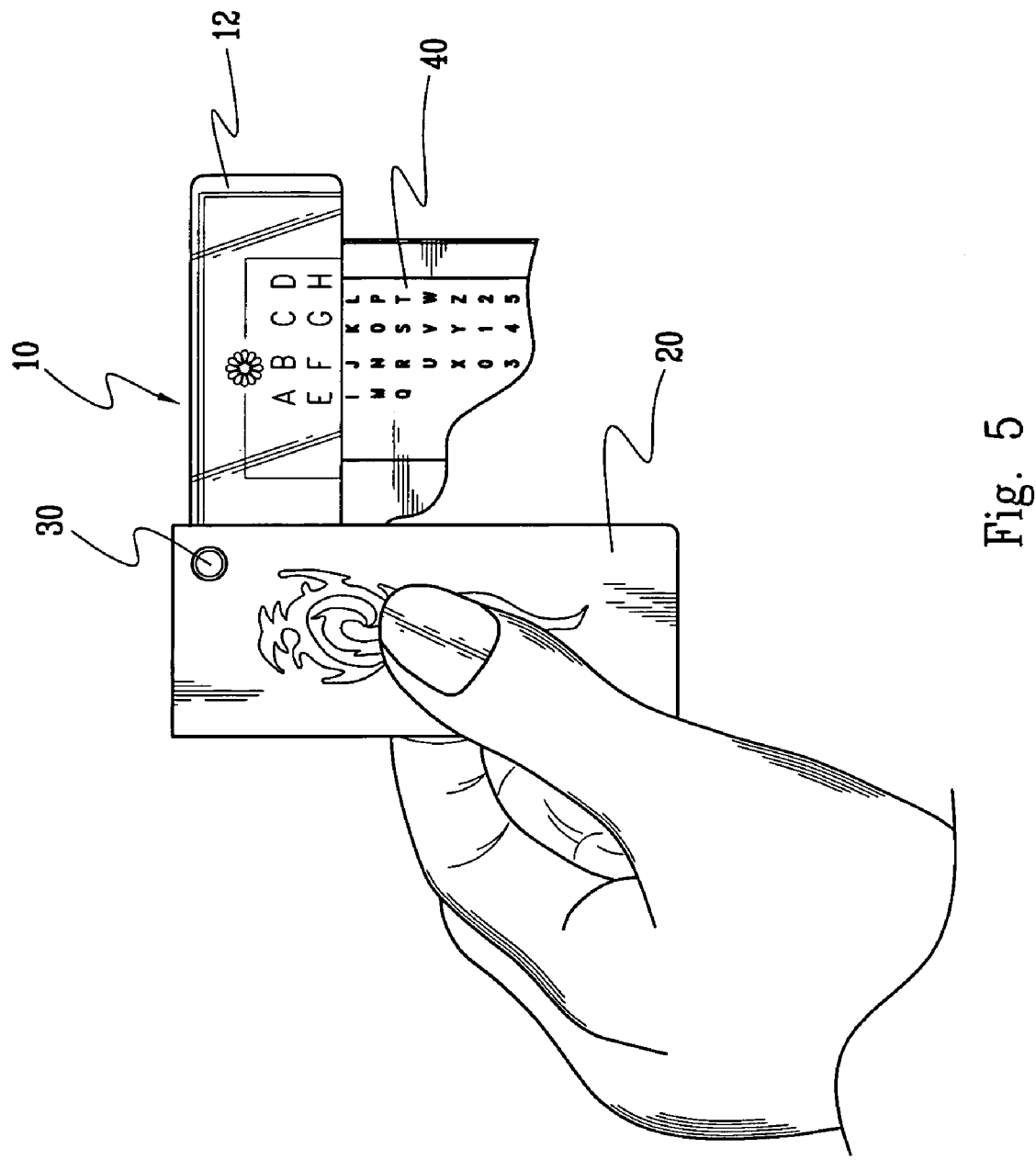
FIG. 5 is a perspective view showing that the present invention is used as a magnifier.

Referring to FIGS. 3 to 5, when using the present invention as a magnifier, the two magnetic vanes 21, 22 are forcedly unfolded and then the transparent magnifying member 10 is pivoted about the pivot member 30 out of the magnetic jacket 20. At this time, the magnifier 12 of the transparent magnifying member 10 is exposed to outer side of the magnetic jacket 20. A user can hold the magnetic jacket 20 with a hand to see an object 40 through the magnifier 12. In use, the magnifier 12 will not be contaminated. When not used, the transparent magnifying member 10 is reversely pivoted back to its home position where the transparent magnifying member 10 is hidden in the magnetic jacket 20. Under such circumstance, the magnifier 12 is protected from being scraped by any alien article. In addition, by means of the attraction between the two magnetic vanes 21, 22, the transparent magnifying member 10 is firmly clipped and hidden in the magnetic jacket 20 without loosening and unexpectedly moving out. In a derived embodiment, the lengths of the vanes 21, 22 can be equal to each other or unequal to each other. The configuration of the transparent magnifying member 10 can be different from that of the magnetic jacket 20.

Figure 6:
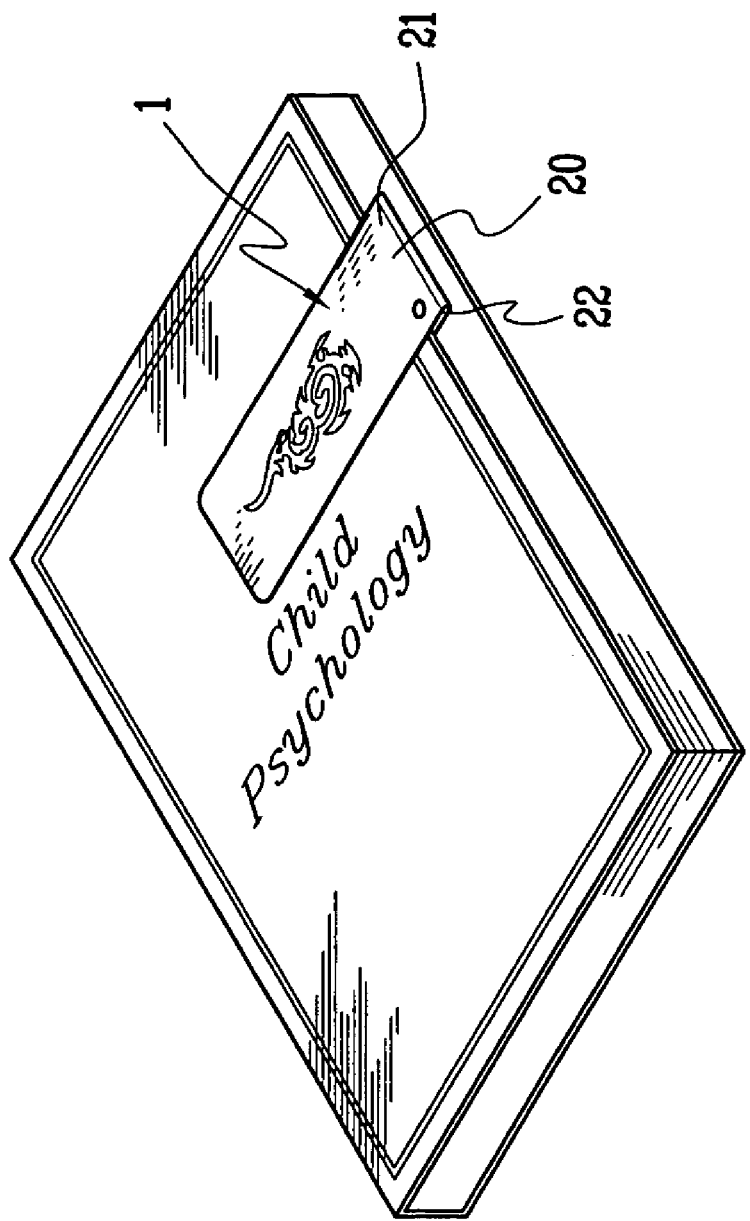
FIG. 6 is a perspective view showing that the present invention is used as a bookmark.

FIG. 6 shows another embodiment of the present invention, in which the thin magnifier structure 1 with magnetic protective jacket is used as a bookmark. The magnetic jacket 20 directly rides on the edge of a page of a book to mark the page. By means of the attraction between the two magnetic vanes 21, 22, the page is firmly clipped between the vanes 21, 22 so that the thin magnifier structure 1 can be firmly located on the page without easily dropping when turning the pages of the book.

The above embodiments are only used to illustrate the present invention, not intended to limit the scope thereof. Many modifications of the above embodiments can be made without departing from the spirit of the present invention.

What is claimed is:

1. A thin magnifier structure with magnetic protective jacket comprising a transparent magnifying member, a magnetic jacket and a pivot member, the transparent magnifying member having a magnifier and being clipped and hidden in the magnetic jacket, the transparent magnifying member and the magnetic jacket being pivotally connected with each other via the pivot member, whereby the transparent magnifying member can be pivoted about the pivot member out of or into the magnetic jacket, wherein the magnetic jacket has two vanes which magnetically attract each other.

2. The thin magnifier structure with magnetic protective jacket and claimed in claim 1, wherein the vanes of the magnetic jacket have unequal lengths.

3. The thin magnifier structure with magnetic protective jacket and claimed in claim 2, wherein the transparent magnifying member has a configuration different from that of the magnetic jacket.

4. The thin magnifier structure with magnetic protective jacket and claimed in claim 1, wherein the transparent magnifying member has a configuration different from that of the magnetic jacket.

* * * * *